(12) United States Patent
Tang et al.

(10) Patent No.: US 11,211,859 B2
(45) Date of Patent: Dec. 28, 2021

(54) LINEAR VIBRATION MOTOR HAVING GROOVE AND BAFFLE ARRANGED IN GROOVE

(71) Applicant: AAC Acoustic Technologies (Shenzhen) Co., Ltd., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 258 days.

(21) Appl. No.: 16/527,051

(22) Filed: Jul. 31, 2019

(65) Prior Publication Data

US 2020/0044548 A1 Feb. 6, 2020

(30) Foreign Application Priority Data

Aug. 3, 2018 (CN) .......................... 201821252802.1

(51) Int. Cl.
*H02K 33/18* (2006.01)

(52) U.S. Cl.
CPC .................................. *H02K 33/18* (2013.01)

(58) Field of Classification Search
CPC ........ H02K 33/18; H02K 33/16; H02K 33/02; H02K 35/02; B06B 1/04; B06B 1/045
USPC .............................. 310/15, 20, 28–30, 32, 37
See application file for complete search history.

(56) References Cited

U.S. PATENT DOCUMENTS

| | | | |
|---|---|---|---|
| 2009/0096299 A1* | 4/2009 | Ota | B06B 1/045 310/25 |
| 2018/0115231 A1* | 4/2018 | Xu | H02K 5/04 |
| 2018/0236487 A1* | 8/2018 | Endo | B06B 1/045 |
| 2018/0241293 A1* | 8/2018 | Miyazaki | B06B 1/045 |
| 2018/0297061 A1* | 10/2018 | Mao | H02K 5/04 |
| 2020/0044546 A1* | 2/2020 | Zhang | H02K 33/18 |
| 2020/0052567 A1* | 2/2020 | Yamada | H02K 15/03 |
| 2020/0212778 A1* | 7/2020 | Tao | H02K 33/18 |

\* cited by examiner

*Primary Examiner* — Michael Andrews
(74) *Attorney, Agent, or Firm* — W&G Law Group

(57) ABSTRACT

Provided is a linear vibration motor, including a housing having a receiving space and including a wall surface, and a stator, a vibrator and an elastic support supporting the vibrator that are received in the housing. The vibrator includes a body having a receiving hole, and a magnetic circuit structure fixed to an inner wall of the receiving hole and forming a magnetic gap. The stator is fixed to the wall surface and located in the magnetic gap. The magnetic circuit structure includes first permanent magnets opposite to and spaced apart from each other, each of which includes a first surface facing the wall surface, and a second surface opposite to the first surface. At least one of the first and second surfaces is recessed towards the other of the first and second surfaces to form a groove. A baffle is provided in the groove and fixed to the body.

9 Claims, 8 Drawing Sheets

LINEAR VIBRATION MOTOR HAVING GROOVE AND BAFFLE ARRANGED IN GROOVE

TECHNICAL FIELD

The present disclosure relates to the field of vibration motor technologies, and in particular, to a linear vibration motor for portable consumer electronic products.

BACKGROUND

With development of the electronic technology, portable consumer electronic products, such as mobile phones, hand-held game machines, navigation devices or hand-held multimedia entertainment devices, are becoming more and more popular. In these electronic products, vibration motors are generally used for system feedback, such as call notification of the mobile phone, message notification, navigation notification and vibration feedback of the game machine.

A linear vibration motor in the related art includes a vibrator and a stator. The vibrator includes a weight having a receiving hole; a magnetic frame fixed in the receiving hole; and a magnetic circuit structure fixed to the magnetic frame. The stator is located in the receiving hole and includes a coil. However, in such a linear vibration motor, the magnetic circuit structure is fixed to the magnetic frame by glue. Since an adhesion force of the glue is not very large, a phenomenon of magnet falling may occur during a drop test.

Therefore, it is necessary to provide a new linear vibration motor to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
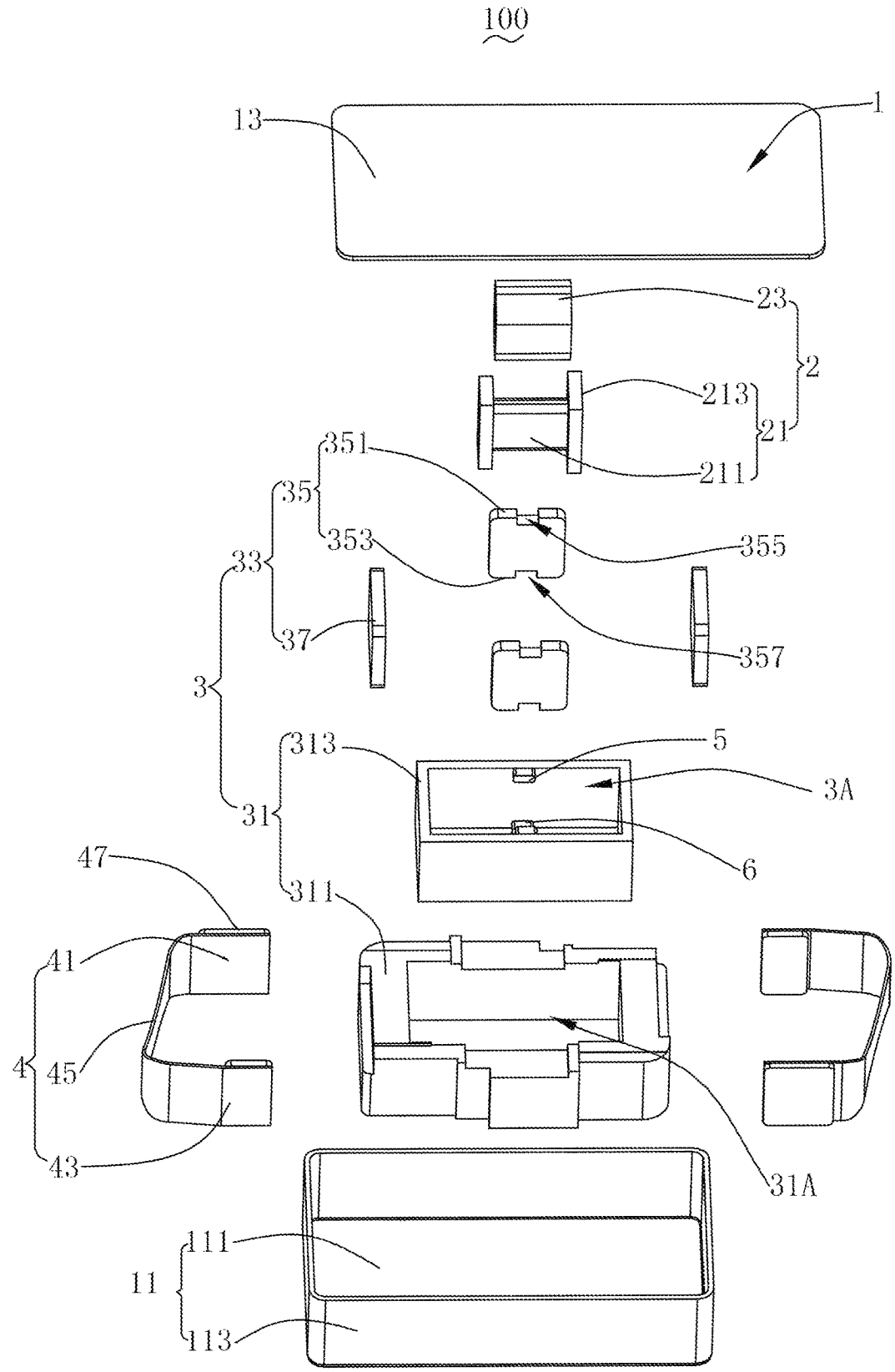
FIG. 1 is an perspective exploded view of a linear vibration motor according to an embodiment of the present disclosure.
Figure 2:
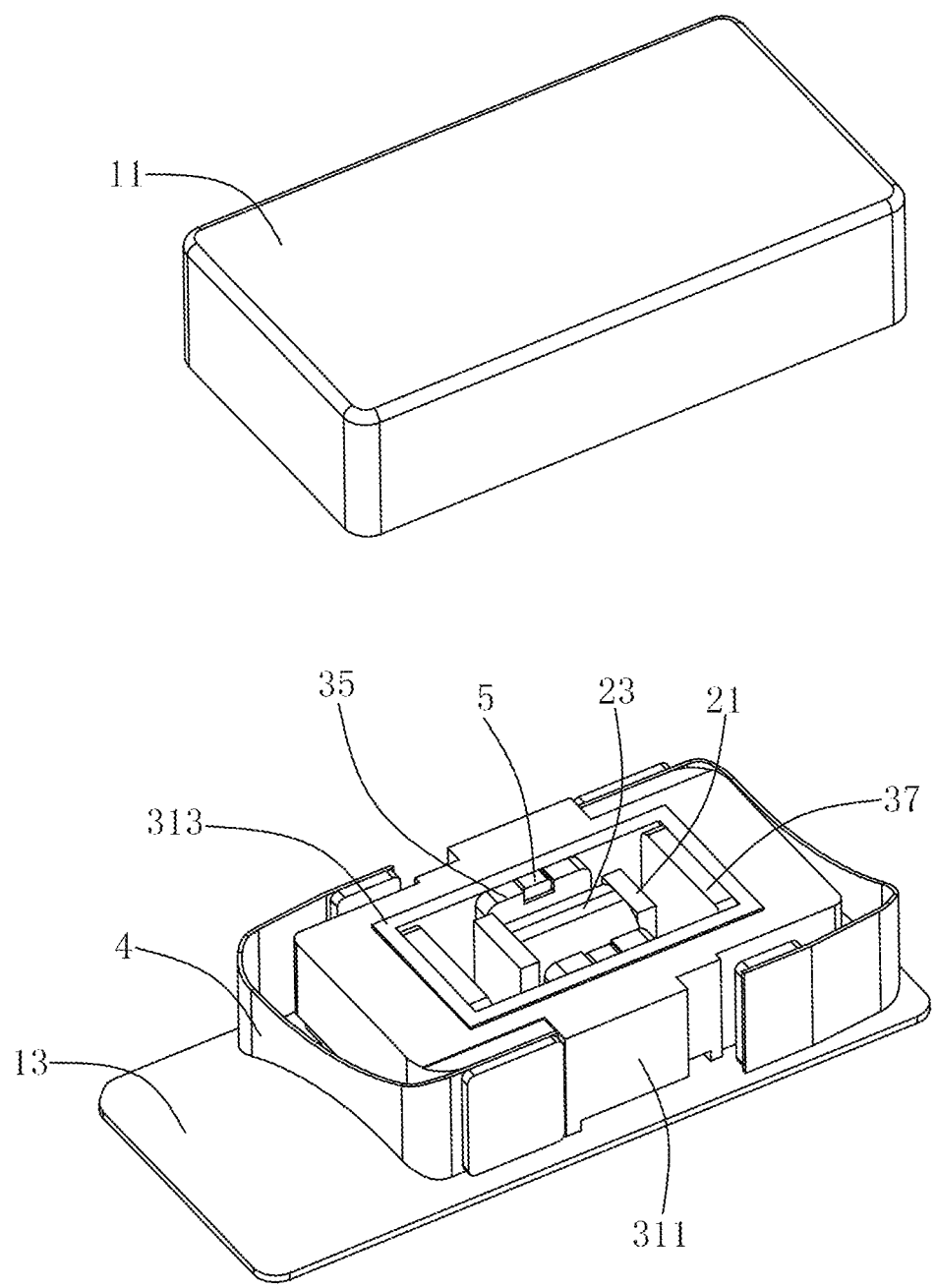
FIG. 2 is a partial exploded schematic diagram of the linear vibration motor shown in FIG. 1.
Figure 3:
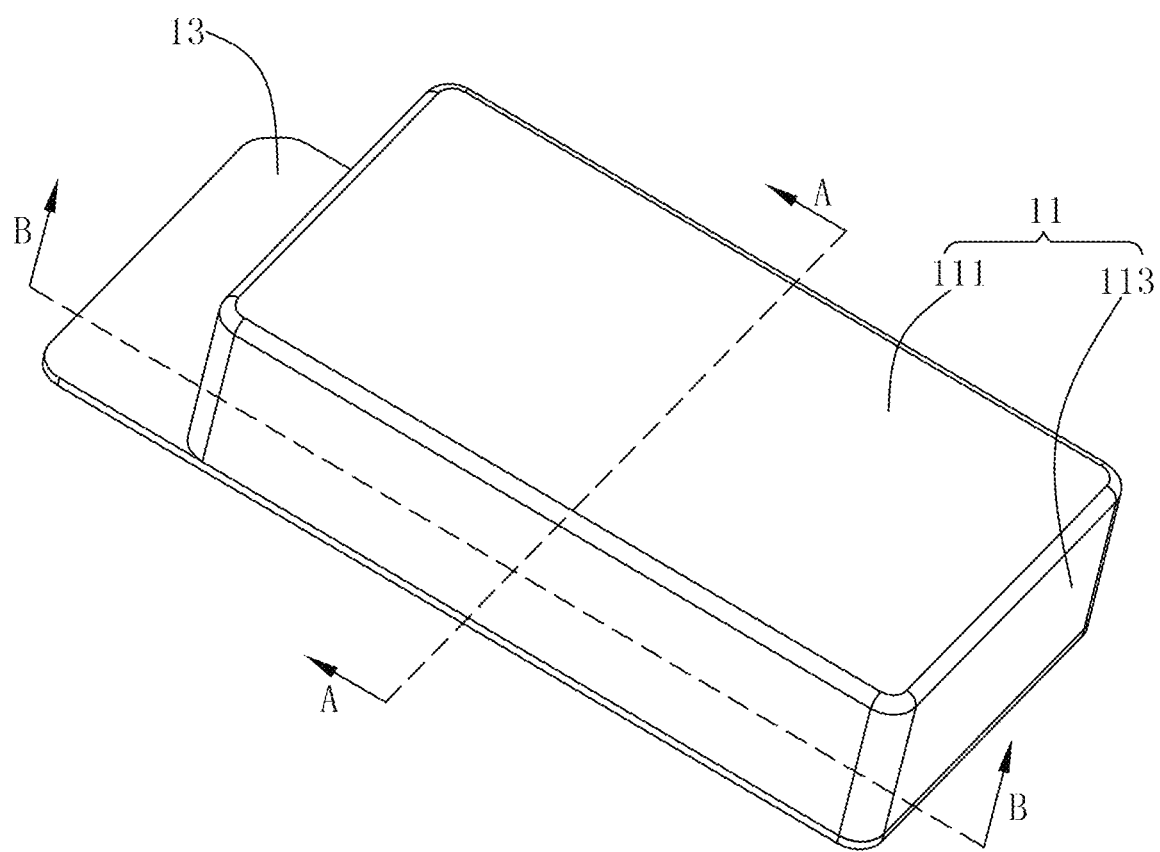
FIG. 3 is a perspective view of the linear vibration motor shown in FIG. 1 after being assembled.

The present disclosure will be further illustrated with reference to the accompanying drawings and the embodiments.

Embodiment 1

As shown in FIGS. 1 to 5, a linear vibration motor 100 includes a housing 1 having a receiving space 100A; a stator 2; a vibrator 3; and an elastic support 4 supporting the vibrator 3. The stator 2, the vibrator 3 and the elastic support 4 are received in the housing 1.

The housing 1 has an elongated shape. The elastic support 4 supporting the vibrator 3 is fixed at two ends of the housing 1 along a long axis direction thereof. The vibrator 3 is suspended in the housing 1 by the elastic support 4. The vibrator 2 may vibrate along the long axis direction of the housing 1.

The housing 1 includes a shell 11 and a cover 13. The cover 13 is assembled with the shell 11 to form the receiving space 100A. In this embodiment, a surface of the cover body 13 facing right towards the receiving space 100A is a wall surface 131.

The shell 11 includes a bottom wall 111 and a side wall 113. The side wall 113 is bent and extends from a circumference of the bottom wall 111. The cover 13 covers the side wall 113 and is connected to the side wall 113.

Figure 4:
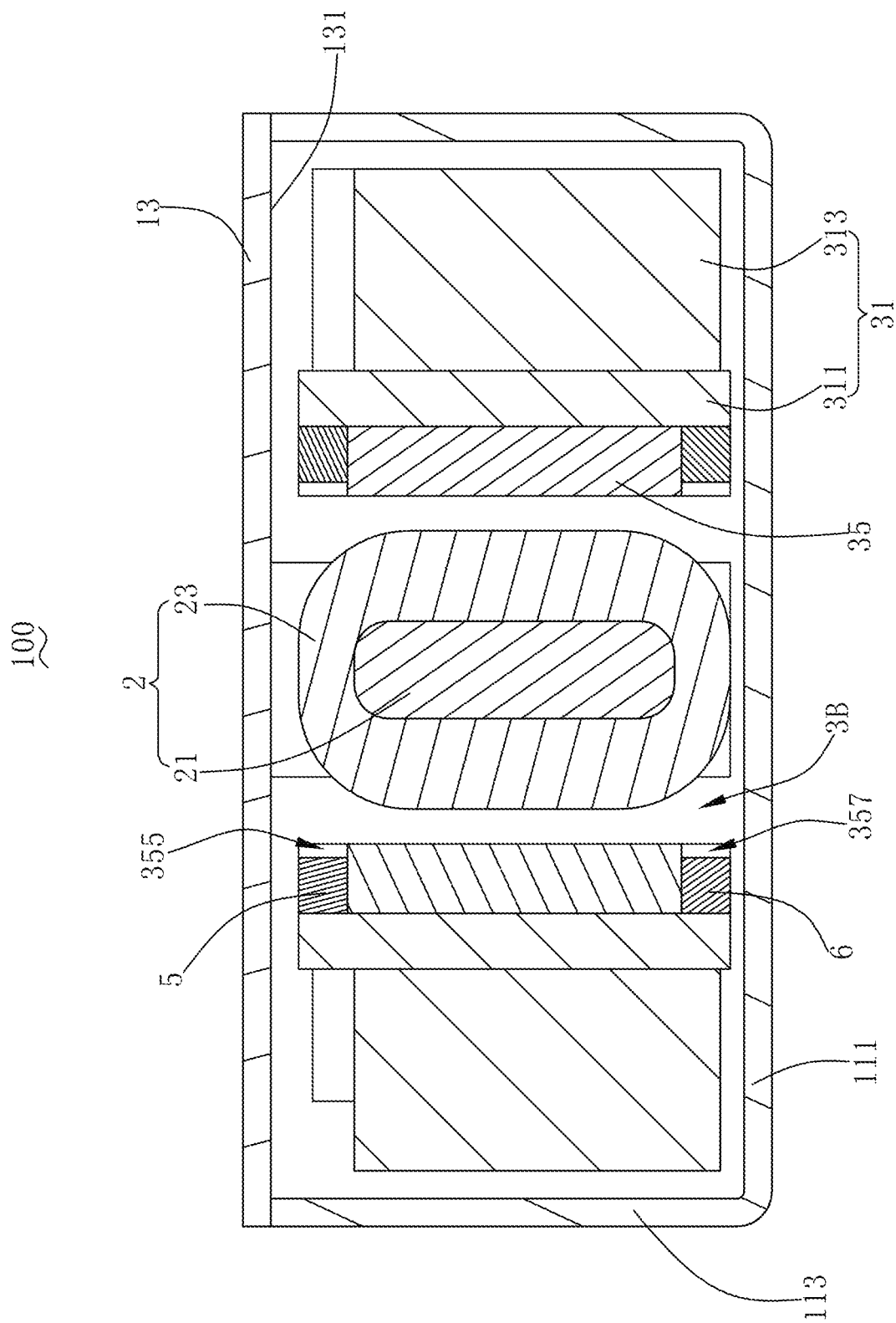
FIG. 4 is a cross-sectional view of the linear vibration motor shown in FIG. 3 taken along line A-A.
Figure 5:
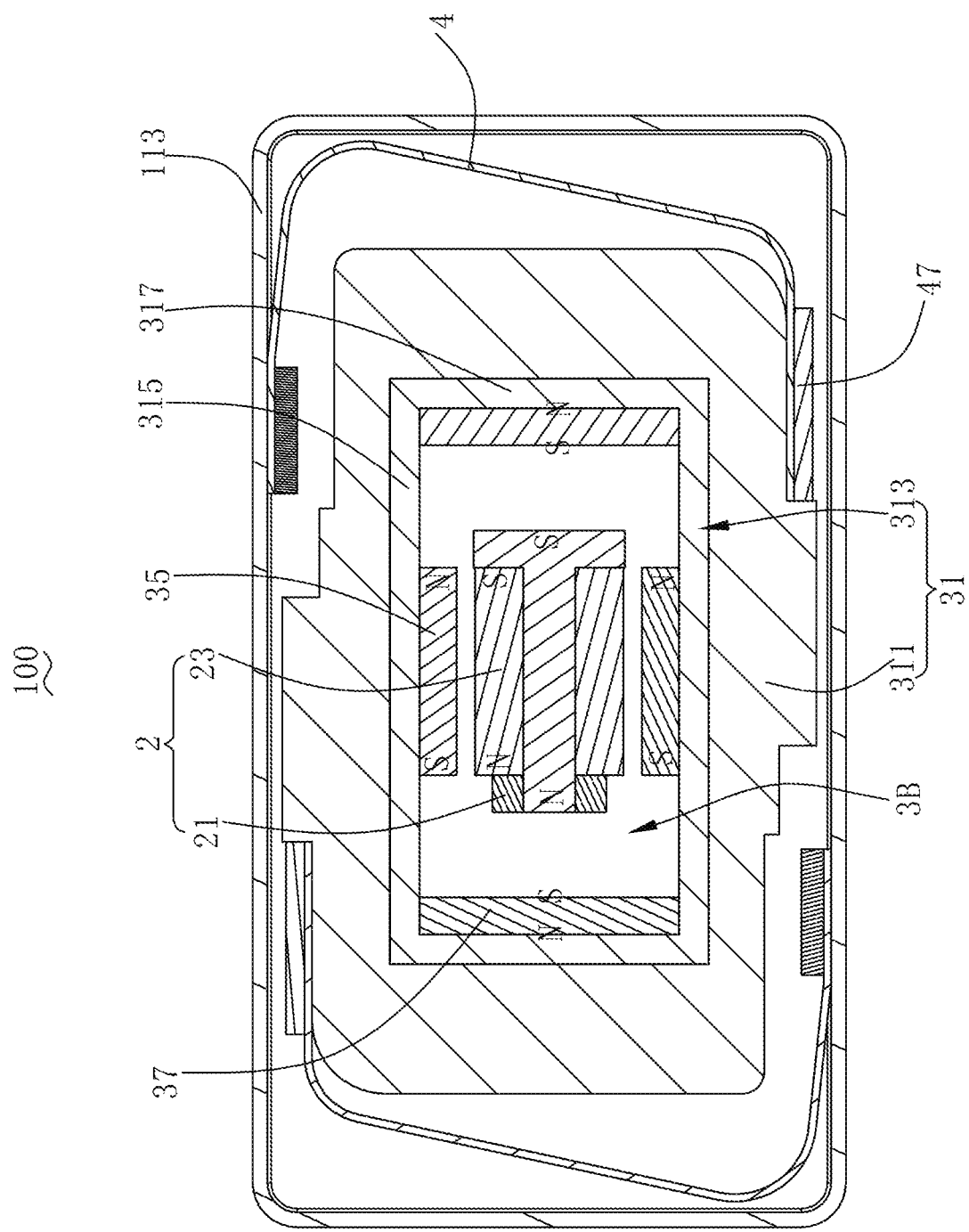
FIG. 5 is a cross-sectional view of the linear vibration motor shown in FIG. 3 taken along line B-B.

The stator 2 is fixed to the wall surface 131. The stator 2 includes a core 21 and a coil 23. The coil 23 is provided on the outer circumference of the core 21. As shown in FIG. 4, an axis direction of the coil 23 is the long axis direction of the housing 1.

The core 21 may be of a column shape or an I shape. In this embodiment, the core 21 is of an I shape, and includes a body portion 211 and fixed ends 213 fixed to two ends of the body portion 211. The coil 23 is wound on the body portion 211. The stator 2 is fixed to the wall surface 131 by the fixed end 213.

The core 21 may be made of a magnetically non-permeable material or iron. In this embodiment, the core 21 is an iron core. After the coil 23 is energized, the core 21 is magnetized by the magnetic field of the coil 23. The magnetized core 21 becomes a magnet. A magnetic field of the magnet and a magnetic field of the coil 23 are superposed, so that the magnetic force of the stator 2 is increased.

The vibrator 3 includes a body 31 having a receiving hole 3A, and a magnetic circuit structure 33 fixed to the inner wall of the receiving hole 3A and forming a magnetic gap 3B. The stator 2 is located in the magnetic gap 3B.

The body 31 includes a weight 311 and a magnetic frame 313. The weight 311 has a receiving hole 3A. The magnetic frame 313 is received in the receiving hole 3A and enclosed to form the receiving hole 3A.

The magnetic circuit structure 33 includes first permanent magnets 35 opposite to and spaced apart from each other. The first permanent magnets 35 may be respectively located on two sides of the coil 23, or the first permanent magnets 35 may be respectively located at two ends of the coil 23 along an axis direction thereof. As shown in FIGS. 1 and 4, the magnetic frame 313 has a rectangular shape, and the magnetic frame 313 includes a long-axis side 315 located on both sides of the coil 23 and a short-axis side 317 located at both ends of the coil 23 along the axial direction thereof. The first permanent magnet 35 is fixed to the long-axis side 315. In this embodiment, the magnetic circuit structure 33 further includes second permanent magnets 37 opposite to and spaced apart from each other, and the second permanent magnet 37 is fixed to the short-axis side 317. The first permanent magnet 35 and the second permanent magnet 37 may be magnets or magnetite. A rapid reaction of the vibration motor can be achieved by providing the first permanent magnet 35 and the second permanent magnet 37.

The first permanent magnet 35 includes a first surface 351 extending in a vibrating direction and facing the wall surface 131 and a second surface 353 provided opposite to the first surface 351. At least one of the first surface 351 and the second surface 353 is recessed towards the other one to form a groove, and a baffle is provided in the groove. The baffle is fixed to the body 31. When the linear vibration motor 100 is dropping, the baffle can effectively prevent the problem of the permanent magnet falling.

As shown in FIGS. 1 and 4, the first surface 351 is recessed towards the second surface 353 to form a first groove 355. The second surface 353 is recessed towards the first surface 351 to form a second groove 357. A first baffle 5 is provided in the first groove 355, and a second baffle 6 is provided in the second groove 357. The first baffle 5 and the second baffle 6 are fixed to the magnetic frame 313 of the body 31. The first groove 355 may be provided only on the first surface 351, and the first baffle 5 fixed to the magnetic frame 313 of the body 31 is provided in the first groove 355. Optionally, the second groove 357 is provided only on the second surface 353, and the second baffle 6 fixed to the magnetic frame 313 of the body 31 is provided in the second groove 357.

In this embodiment, the first baffle 5 and the second baffle 6 are welded and fixed to the magnetic frame 313, thereby ensuring the firm fixation of the first baffle 5 and the second baffle 6 to the magnetic frame 313.

In this embodiment, the first baffle 5 is fixed in the first groove 355 by glue, and/or, the second baffle 6 is fixed in the second groove 357 by glue.

In this embodiment, each of the first baffle 5 and the second baffle 6 is made of a magnetically non-permeable material.

The elastic support 4 is a U-shaped spring. Two elastic supports 4 are provided, and opening directions of the two elastic supports 4 are opposite to each other.

The elastic support 4 includes a first fixed portion 41, a second fixed portion 43 and a deformation portion 45. The first fixed portion 41 is connected to the weight 311. The second fixed portion 43 is connected to the side wall 113, and is parallel to and spaced apart from the first fixed portion 41. The deformation portion 45 connects the first fixed portion 41 with the second fixed portion 43.

A buffer plate 47 is provided between the first fixed portion 41 and the side wall 113, and provided between the second fixed portion 43 and the weight 311. The buffer plate 47 can be made of foam, rubber, silica or the like. The buffer plate 47 can prevent the elastic support 4 from colliding with the side wall 113 and the weight 311 of the vibrator 3 during vibration of the vibrator 3, thereby improving the reliability of the product.

Embodiment 2

Figure 6:
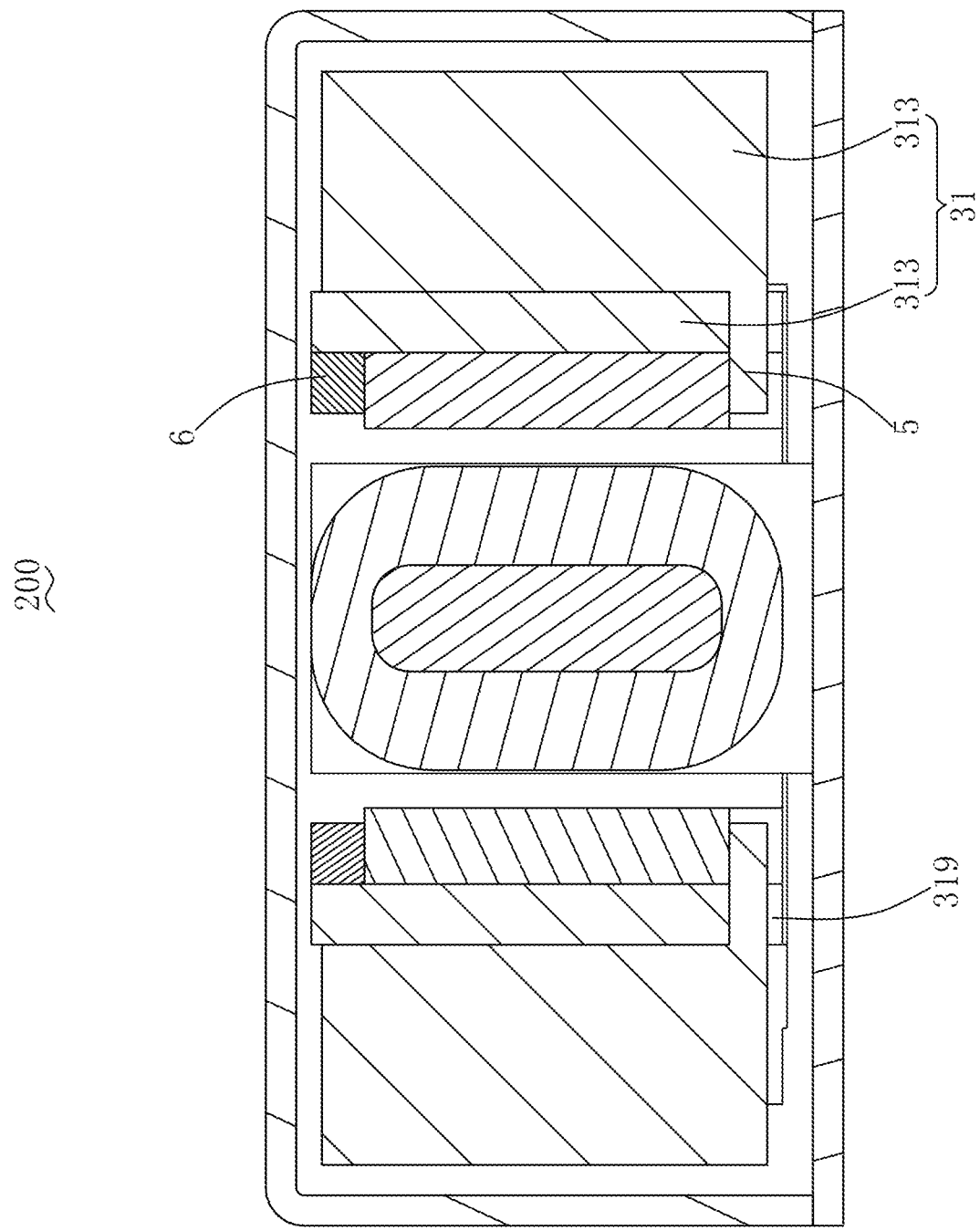
FIG. 6 is a cross-sectional view showing a linear vibration motor according to another embodiment of the present disclosure.
Figure 7:
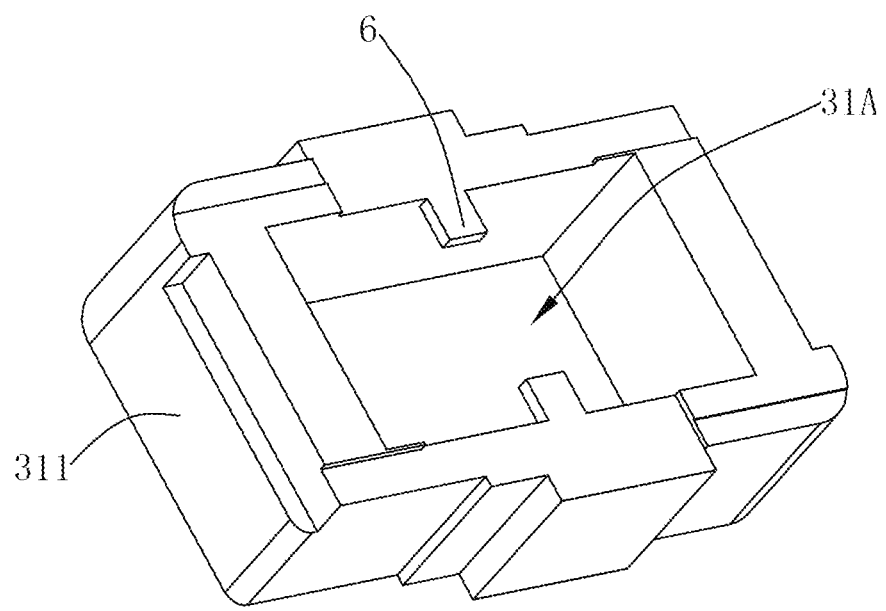
FIG. 7 is a perspective view of a weight and a first baffle in the linear vibration motor shown in FIG. 6.
Figure 8:
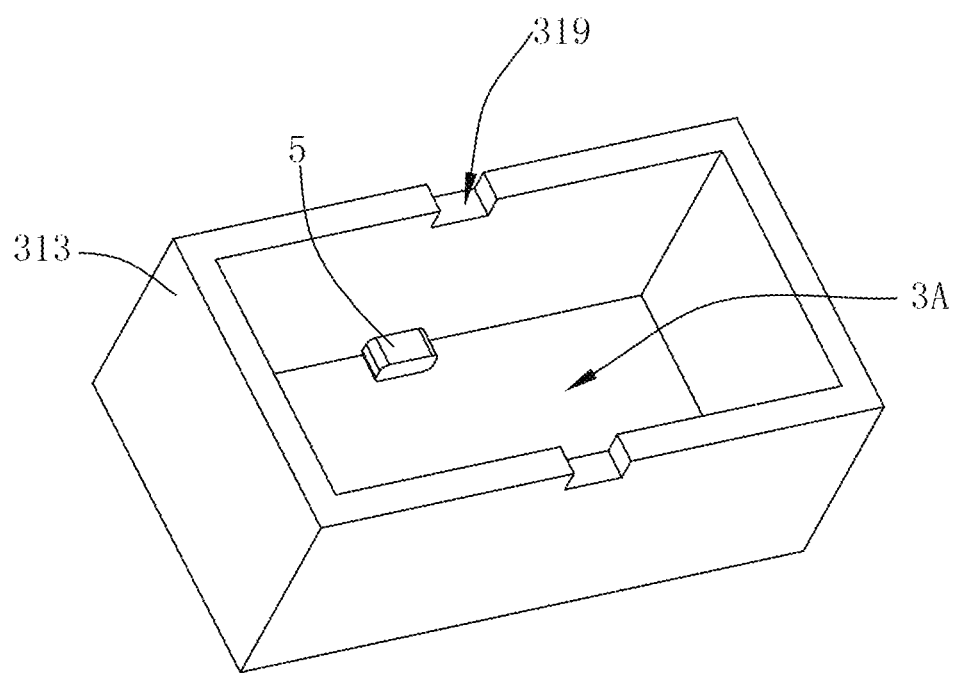
FIG. 8 is a perspective view of a magnetic frame and a second baffle in the linear vibration motor shown in FIG. 6.

Referring to FIGS. 6 to 8, Embodiment 2 differs from Embodiment 1 in that the first baffle 5 and the weight 311 are formed into one piece, an avoiding groove 319 for avoiding the first baffle 5 is formed on the magnetic frame 313, and the second baffle 6 is fixed to the magnetic frame 313.

The first baffle 5 is fixed in the second groove 357 and the avoiding groove 319 by glue.

It should be noted that, in other embodiments, the second permanent magnet 37 may also be provided with a groove, and a baffle fixed to the body is provided in the groove. In other embodiments, the body 31 may also not include a magnetic frame, and the first baffle 5 and the second baffle 6 are fixed to the weight.

With the linear vibration motor 100 provided by the present disclosure, by providing a groove on the first permanent magnet 35 and providing a baffle fixed to the body 31 in the groove, the baffle can effectively prevent the permanent magnet falling when the linear vibration motor 100 is dropping.

The above are only preferred embodiments of the present disclosure. Here, it should be noted that those skilled in the art can make modifications without departing from the inventive concept of the present disclosure, but these shall fall into the protection scope of the present disclosure.

What is claimed is:

1. A linear vibration motor, comprising:
   a housing having a receiving space;
   a stator;
   a vibrator; and
   an elastic support supporting the vibrator,
   wherein the stator, the vibrator and elastic support are received in the housing; the housing comprises a wall surface; the vibrator comprises a body having a receiving hole, and a magnetic circuit structure fixed to an inner wall of the receiving hole and forming a magnetic gap; the stator is fixed to the wall surface and located in the magnetic gap; the magnetic circuit structure comprises first permanent magnets opposite to and spaced apart from each other; each of the first permanent magnets comprises a first surface extending in a vibrating direction and facing the wall surface, and a second surface opposite to the first surface; at least one of the first surface and the second surface is recessed towards the other of the first surface and the second surface to form a groove; and a baffle is provided in the groove and fixed to the body;
   the first surface is recessed towards the second surface to form a first groove; the second surface is recessed towards the first surface to form a second groove; a first baffle is provided in the first groove; a second baffle is provided in the second groove; and the first baffle and the second baffle are fixed to the body.

2. The linear vibration motor as described in claim 1, wherein the body comprises a weight having a receiving hole, and a magnetic frame received in the receiving hole and enclosed to form the receiving hole.

3. The linear vibration motor as described in claim 2, wherein the first baffle and the second baffle are fixed to the magnetic frame.

4. The linear vibration motor as described in claim 3, wherein the first baffle and the second baffle are welded and fixed to the magnetic frame.

5. The linear vibration motor as described in claim 2, wherein the first baffle and the weight are formed into one piece; an avoiding groove for avoiding the first baffle is formed on the magnetic frame; and the second baffle is fixed to the magnetic frame.

6. The linear vibration motor as described in claim 5, wherein the second baffle is welded and fixed to the magnetic frame.

7. The linear vibration motor as described in claim 1, wherein the first baffle is fixed in the first groove by glue, and/or the second baffle is fixed in the second groove by glue.

8. The linear vibration motor as described in claim 1, wherein each of the first baffle and the second baffle is made of a magnetically non-permeable material.

9. The linear vibration motor as described in claim 1, wherein the stator comprises a core and a coil provided on an outer circumference of the core, and the first permanent magnets are respectively located at two sides of the coil or located at two ends of the coil along an axis direction of the coil.

\* \* \* \* \*